May 6, 1947. F. E. JOHNSON 2,420,042
SHIFTABLE ROTARY OPERATIVE FASTENER ATTACHING UNIT
Filed Oct. 12, 1944
*Fig. 1.*
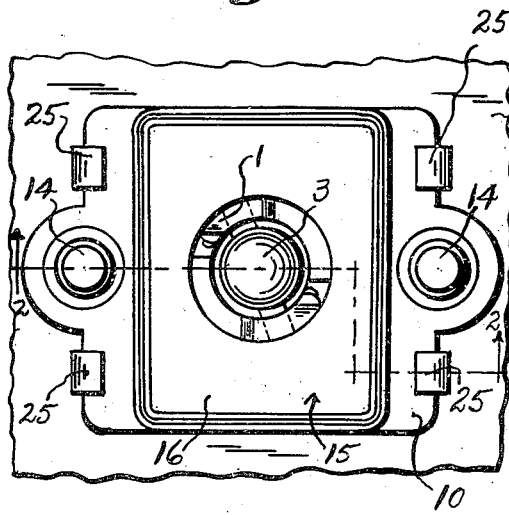
*Fig. 2.*
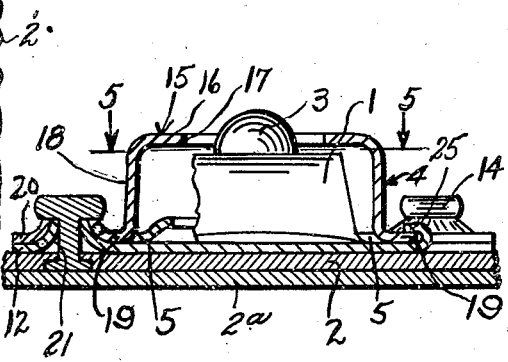
*Fig. 3.*
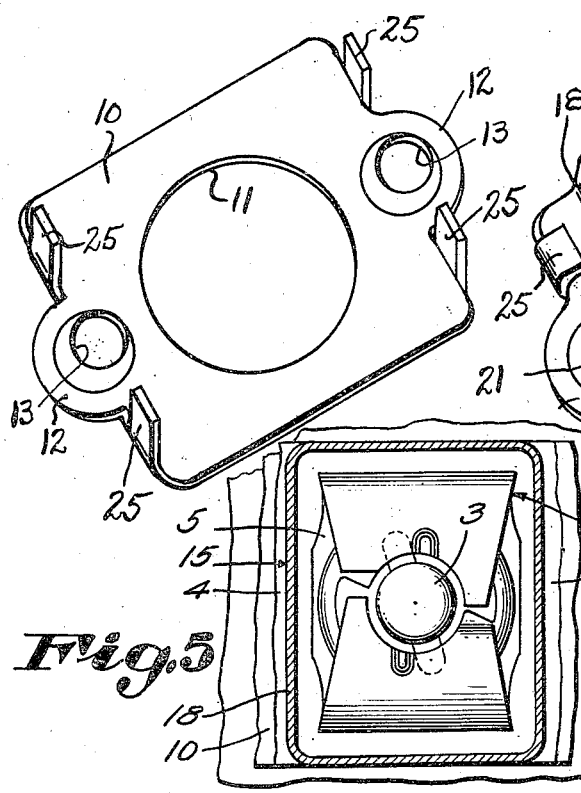
*Fig. 4.*
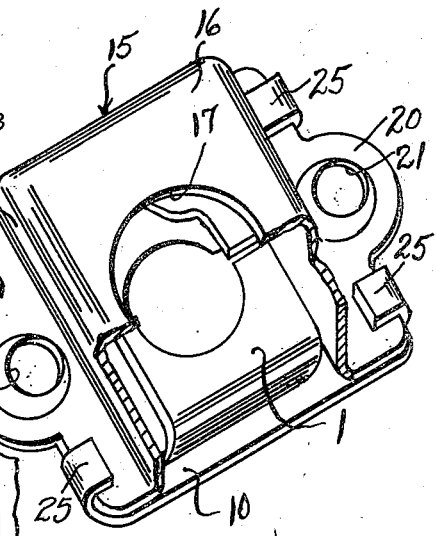
*Fig. 5*
Inventor
Frank E. Johnson.
By
Walter J. Jones
Attorney Patented May 6, 1947

2,420,042

UNITED STATES PATENT OFFICE 2,420,042

SHIFTABLE ROTARY OPERATIVE FASTENER ATTACHING UNIT

Frank E. Johnson, Malden, Mass., assignor to United-Carr Fastener Corporation, Cambridge, Mass., a corporation of Massachusetts Application October 12, 1944, Serial No. 558,419

6 Claims. (Cl. 24—221)

1

The present invention relates to improvements in rotary operative type fasteners, such as those employed for connecting together airplane cowling sheets, and aims generally to improve existing fasteners of that type.

More particularly the invention provides an improved and novel construction of female fastener assembly for such rotary operative type fasteners, in which the female fastener member may be shiftably mounted relative to the aperture in the support to which it is attached to facilitate its alignment with the rotary stud member mounted in a part to be attached to the support.

A further object of the invention is to improve and simplify the construction of shiftable rotary operative fastener assemblies to permit the several parts to be formed of extremely light weight material and separately heat-treated prior to assembly.

Other aims and objects of the invention will be apparent to those persons skilled in the art from a consideration of the accompanying drawings and annexed specification illustrating and describing a preferred embodiment of the invention.

In the drawings:

Fig. 1 is a plan view of a rotary operative type of fastener installation embodying the present invention;

Fig. 2 is a longitudinal sectional view thereof taken on the line 2—2 of Fig. 1, the stud and socket parts of the fastener being shown in elevation;

Fig. 3 is a detail perspective view of the attaching plate of the assembly; and

Fig. 4 is a perspective view of the assembly parts of the retainer machine being broken away to better illustrate the construction.

Fig. 5 is a sectional view taken along the line 5—5 of Fig. 2, the cover of the retainer housing being broken away to show the interior of the housing.

Referring more particularly to the drawings, the invention provides new and improved means for shiftably attaching a female socket or fastener member to a suitably apertured support, such as one of the parts of airplane cowling, though it is to be understood that the invention is susceptible of general application and is not restricted to such use.

Rotary operative type fasteners, such as those used for securing airplane cowling sheets together, usually include a female fastener or socket member 1 suitably attached to one side of an apertured supporting sheet 2 and adapted to receive and interlock with a rotary male fastener member 3 rotatably mounted in a part 4 to be secured to the support 2. The rotary male fastener element may be formed with lateral projections such as radial arms, adapted to overlie and be engaged with a locking seat of the female fastener 1 spaced outwardly from the support 2. Upon turning of the rotary male fastener member 3, the lateral projections thereof will engage the seat and thus hold the support 2 and part 4 in rigid fastened relationship.

The female fastener or socket member may be of any approved type and construction to receive and lockingly cooperate with a rotary male element 3. Preferably the female fastener member includes a base 5 and an outwardly spaced seat for locking engagement with the rotary male element 3 extended through a second supporting plate 2a. In the illustrated form, the socket member 1 is of the type disclosed and claimed in the prior patent of William A. Bedford, Jr., No. 2,306,928, granted December 29, 1942, to which reference is made for a more complete disclosure of a preferred type of female fastener member.

The invention provides an improved assembly of a female fastener member and an attaching means therefor for shiftably mounting the female fastener member upon its support 2 overlying the aperture thereof.

According to the invention, there is provided an attaching plate 10 which may have a substantially flat body formed with an enlarged central aperture 11 therein and end extensions 12 apertured as at 13 to receive attaching elements such as rivets 14 for securing the attaching member 10 to the support 2. The body 10 of the attaching plate is substantially larger in area than the cross-sectional area of the fastener member 1 so that the former provides a slidable bearing surface for the fastener member 1.

The fastener member 1 is retained upon the attaching plate 10 by means of a retainer 15 which may comprise a suitably shaped housing or box having a cover 16 apertured as at 17 to permit the passage of the nose end of the rotary male fastening member 3. The retainer member is preferably formed with sides 18 disposed at an angle to the cover 16 and at least two of which are provided with flanged extensions 19 bearing against the attaching plate 10. The shape of the flanged extensions 19 may conform to the shape of the underlying parts of the attaching plate 10 and preferably these flanges are provided with extensions 20 apertured as at 21 to align with the apertures 13 of the attaching plate 10. Preferably the portions of the extensions 12 of the plate 10 and extensions 20 of the flanges 19, surrounding the apertures, are outwardly dished or conical shaped so as to interfit one with the other and thus provide self-centering means between the attaching plate 10 and retainer 15.

The housing portion of the retainer 15 as defined by the cover 16 and sides 18 is preferably larger than the cross-sectional area of the fastener member 1 so that the latter may float or be shiftably mounted therein. The retainer 15 may be secured to the attaching plate in any suitable manner, as for example by tongues or extensions 25 formed on one of the parts, for example the attaching member 10, and adapted to be bent over the marginal edges of the other part, as for example, the flanges 19 of the retainer 15.

The several parts of my improved fastener assembly, and particularly the female fastener member and plate 10, may be separately heat-treated and plated as desired and thereafter assembled together prior to attachment to the support. This is of advantage as it enables the parts subjected to maximum strain to be formed of relatively light metal, which is of great advantage in aircraft construction.

By having the attaching plate 10 and retainer 15 of corresponding symmetrical outline as shown, accurate assembly of the parts is facilitated while insuring that these parts will be so positioned relative to each other as not to interfere with the shiftability of the female fastener 1.

It is to be understood that the invention is not restricted to the details shown and described, as the scope of the invention is best defined in the appended claims.

I claim:

1. An attaching unit for securing a fastener part to a support, said unit including a plate member adapted to support said fastener part and having a central aperture, and a separate retainer means secured to said plate member and adapted to encompass said fastener part.

2. An attaching unit for securing a fastener part to a support, said unit including a plate member adapted to support said fastener part and having a central aperture, and a housing part for receiving said fastener part, said plate member and said housing part having cooperating fastener means for securing said parts in assembly.

3. An attaching unit for securing a fastener part to a support, said unit including a plate member adapted to support said fastener part and having a central aperture, and a housing part for receiving a fastener part, said plate member being formed with apertures for the reception of attaching members for attaching said unit to a support.

4. An attaching unit for securing a fastener part to a support, said unit including a plate member adapted to support said fastener part and having a central aperture, and a housing part for receiving a fastener part, said housing having flange elements engaging said plate member.

5. An attaching unit for securing a fastener part to a support, said unit including a plate member adapted to support said fastener part and having a central aperture, and a housing part secured to said plate member, said housing having a cover portion and side walls for enclosing said fastener part.

6. An attaching unit for securing a fastener part to a support, said unit including a plate member adapted to support said fastener part and having a central aperture, and a housing part secured to said plate member, said housing having an apertured cover portion and side walls for enclosing said fastener part, and said housing having flange elements engaging said plate member.

FRANK E. JOHNSON.

REFERENCES CITED

The following references are of record in the file of this patent:

UNITED STATES PATENTS

| Number | Name | Date |
|---|---|---|
| 2,356,412 | Jones | Aug. 22, 1944 |
| 2,337,483 | Marty | Dec. 21, 1943 |